3,000,842
Patented Sept. 19, 1961

3,000,842
POLYVINYL BUTYRAL-AMYLPOLYSILOXANE RESIN BLENDS FOR TREATING ASBESTOS-CEMENT SHINGLES AND METHOD FOR USING SAME
Paul A. Homier, Tarlin, N.J., and Samuel Sterman, Tonawanda, N.Y., assignors to Union Carbide Corporation, a corporation of New York
No Drawing. Filed June 24, 1958, Ser. No. 744,057
8 Claims. (Cl. 260—29.6)

This invention relates to a method of treating asbestos-cement shingles to produce shingles having improved properties, and to compositions for treating asbestos-cement shingles.

Asbestos-cement shingles are well known, and widely used as veneer finishes on the outer surfaces of buildings and similar structures. However, asbestos-cement shingles, and other structural articles of similar composition, have a ready tendency to absorb moisture when exposed to rain and weathering conditions. While this does not usually have a deleterious effect upon the over-all durability of such articles, it does cause these articles to have an unsatisfactory appearance by causing them to warp, stain and bloom. Thus, when a shingle is wet on one side and dry on the other, it has a tendency to warp. Staining is caused by deposits of dirt on the shingle being carried into the substratum of the shingle by rain. Blooming, which is the accumulation of white deposits on the surface of asbestos-cement shingles, is caused by the efflorescence of water-soluble compounds within the shingle to the surface by the action of water. This phenomena is particularly objectionable in colored shingles where it causes very noticeable color changes.

It is, therefore, the primary object of this invention to provide an improved surface treatment for asbestos-cement shingles, and similar structural articles, which imparts improved water-repellent and weathering properties to such materials, and substantially eliminates the aforementioned phenomenon occurring in said materials.

The need for a more satisfactory means of improving the water-repellent and weathering properties of asbestos-cement shingles has long been known, but prior to the present invention, no completely satisfactory solution to the problem has been attained.

Treatment of asbestos-cement shingles with various wax compositions is well known, but because of the non-permanency of the treatment, it has not been generally adopted. Treatment with various organic resins, such as polyacrylates, polystyrene, polybutadiene, polyacrylonitrile, polyethylene and the like, and various polysiloxane resins, such as methylsiloxane, ethylsiloxane, amylsiloxanes and the like, has not proven totally satisfactory. While these various organic and polysiloxane resins alleviate one or more of the problems associated with asbestos-cement shingles, no single resin has solved them all. Coatings of both organic and polysiloxane resins, while together imparting improved properties to asbestos-cement shingles, have likewise not proven entirely satisfactory.

In the manufacture of asbestos-cement products, a curing period is necessary in order to develop suitable handling strength. Curing may be accomplished by storing the asbestos-cement products at room temperature for extended periods (approximately 28 days), or by treating the products with pressurized steam in an autoclave for shortened curing periods (approximately 8 hours at 100 p.s.i.).

In whatever manner curing is accomplished, for the sake of manufacturing efficiency and economy, any water-repellency treatment of asbestos-cement products should be applied prior to curing. However, due to the highly alkaline nature of these products, either storage or autoclaving tends to destroy the effectiveness of many of the coatings proposed for this purpose.

This invention is based upon the finding that certain polyvinyl butyral-amylpolysiloxane resin blends are excellent treating agents for asbestos-cement shingles. When these resins are blended and coated on asbestos-cement shingles, they have been found to possess weathering properties distinctly superior to any other coatings known for this purpose. In addition, coatings of these resin blends have been found to possess greater permanency and to better survive the usual storage or autoclaving periods employed in the curing of asbestos-cement shingles.

The polyvinyl butyral resins employed according to this invention are well known in the art. They may be prepared, for example, by reacting butyraldehyde with a partially or completely hydrolyzed polyvinyl ester (usually polyvinyl acetate). Polyvinyl butyral resins prepared in this manner may have a certain number of ester groups, originally present in the polyvinyl ester, which have not been hydrolyzed, as well as a certain number of hydroxyl groups which have not been replaced with butyral groups. According to a preferred embodiment of this invention, the polyvinyl butyral resin contains, on a weight basis, approximately 2% to 25% hydroxyl groups calculated as polyvinyl alcohol.

The amylpolysiloxane resins employed according to this invention are well known in the art. They may be prepared by hydrolyzing and condensing various amylsilanes, such as amyltrichlorosilane or amyltriethoxysilane. Polysiloxane resins prepared by hydrolyzing and condensing a mixture of a trifunctional amylsilane, such as amyltrichlorosilane, and a tetrafunctional silicate, such as tetraethyl silicate, are particularly suitable for the purposes of this invention.

Although limited amounts of siloxane units other than amylsiloxane units, preferably higher alkyl siloxane units (i.e. having an alkyl chain greater than five carbon atoms), may be present in the polysiloxane resin, in a preferred embodiment of this invention, only amylsiloxane units, or amylsiloxane units and units of the type $SiO_2$ are present.

The polyvinyl butyral-amylpolysiloxane resin blends of this invention are applied in the form of an aqueous emulsion using conventional methods, such as brushing or spraying, or where individual units are treated prior to assembly, by dipping. The emulsion may be prepared by mixing separate emulsions of polyvinyl butyral and amylpolysiloxane resins, and stirring. The separate emulsions of polyvinyl butyral and amylpolysiloxane resins may be prepared using known emulsification techniques.

The emulsion of polyvinyl butyral-amylpolysiloxane resin blends can contain from about 1.6 percent to about 32 percent by weight total resin. Preferably, it contains from about 8 percent to about 12 percent by weight total resin. The polyvinyl butyral resin is employed in the emulsion in an amount ranging from about 33 percent to about 95 percent by weight, preferably from about 57 percent to about 82 percent by weight, of the total resin content, while the amylpolysiloxane resin is employed in an amount ranging from about 5 percent to about 67 percent by weight, preferably from about 18 percent to about 43 percent by weight, of the total resin content.

The emulsion should be employed in an amount sufficient to impart a loading of from about 10 to about 320 grams of combined resin per "square" of shingle surface (114 square feet). Preferably, the emulsion is employed in an amount sufficient to impart a loading of from about 80 to about 120 grams of combined resin per "square." For economical reasons, the loading should be kept as low as is consistent with desired results.

After the resin blend has been applied, the treated asbestos-cement products may be heated, if desired, to remove excess moisture. When the resin blend is applied to newly formed asbestos-cement products which are to be cured by room temperature aging, slightly improved water repellency has been observed when the treated products are heated for about 3 to 5 minutes at 120° C. prior to curing. A short heating period is also effective in improving the water repellency of asbestos-cement products when the resin blend is applied to articles which have been previously cured by either of the methods described above. However, while a short heating period is desirable after the application of the resin blends of this invention, such a heating period is not essential.

It will be apparent to one skilled in the art that certain variations and modifications in the above description may be effected without departing from the spirit of the present invention. The following examples of our invention are set forth for purposes of illustration so that those skilled in the art may better understand our invention, and it should be understood that they are not to be construed as limiting our invention.

*Example I*

Two hundred and eight and three-tenth (208.3) grams of tetraethyl silicate (1 mole) and 1336.2 grams of amyltrichlorosilane (6.5 moles) were added to a volume of isopropyl ether about equal to that of the chlorosilane. Following this, about 200 grams of water (11.1 moles) were added, and the mixture was refluxed to evolve hydrogen chloride produced by the hydrolysis. The residue was neutralized by adding excess sodium bicarbonate, and the mixture was then filtered. Isopropyl ether and excess water were removed by distillation under reduced pressure.

Three hundred (300) grams of the resulting amylpolysiloxane resin were then emulsified in water using morpholine and oleic acid as an emulsifying agent. The resulting emulsion contained 20 percent by weight amylpolysiloxane resin.

*Example II*

One and two-tenth (1.2) parts of a 50 percent by weight polyvinyl butyral resin emulsion (sold commercially by the Shawinigan Resins Corporation, Springfield, Massachusetts, as "Butvar Dispersion BR") and one (1) part of a 20 percent by weight amylpolysiloxane resin emulsion prepared in accordance with Example I were mixed with stirring. The resulting emulsion was then diluted to 6 percent by weight polyvinyl butyral resin and 2 percent by weight amylpolysiloxane resin content.

Eighteen grams of the emulsion were sprayed on the surface of several one-foot by two-foot asbestos-cement shingles which had been aged from 2 to 5 days after manufactured. This gave a resin loading of 0.36 gram of amylpolysiloxane and 1.08 grams of polyvinyl butyral on each of the shingles (this corresponds to a resin loading of 20.5 grams of amylpolysiloxane and 61.5 grams of polyvinyl butyral per "square"). One-half of the treated shingles were then cured by storing for 28 days at room temperature, and the other half were cured by autoclaving with steam for 8 hours at 100 p.s.i.

The treated shingles in each instance manifested a high gloss surface and showed no signs of bloom. Excellent water repellent properties were exhibited by the treated shingles, as shown by the high contact angle of droplets of water sprinkled on the surface of the shingles, and the fact that when 20 ml. of water were applied to the surface of the shingles, the water evaporated without any visible signs of wetting the shingles (no darkening of the shingles). When the surfaces of six-inch squares of shingle were immersed in 100 ml. of water for 10 minutes, the shingles exhibited no visible signs of warping after drying. After four months exposure to outdoor weathering conditions, the shingles exhibited no visible signs of stain, discoloration or deterioration, such as yellowing, chalking or crazing.

*Example III*

An emulsion prepared in accordance with Example I was diluted to 2 percent by weight amylpolysiloxane resin content, and 18 grams of the resulting emulsion were sprayed on the surface of several one-foot by two-foot asbestos-cement shingles which had been aged from 2 to 5 days after manufacture. This gave a resin loading of 0.36 gram of amylpolysiloxane on each of the shingles (this corresponds to a resin loading of 20.5 grams of amylpolysiloxane per "square"). One-half of the treated shingles were then cured by storing for 28 days at room temperature, and the other half were cured by autoclaving with steam for 8 hours at 100 p.s.i.

The storage-cured shingles exhibited excellent water repellent properties, as shown by the high contact angle of droplets of water sprinkled on the surface of the shingles, and the fact that when 20 ml. of water were applied to the surface of the shingles, the water evaporated without any visible signs of wetting the shingles (no darkening of the shingles). However, the shingles exhibited slight bloom and no visible gloss after the curing period. When the surfaces of six-inch squares of shingle were immersed in 100 ml. of water for 10 minutes, the shingles warped slightly upon drying. After four months exposure to outdoor weathering conditions, the shingles were slightly stained but exhibited no visible signs of discoloration or deterioration, such as yellowing, chalking or crazing.

The autoclave-cured shingles manifested no visible gloss and exhibited an amount of bloom comparable to an untreated shingle. These shingles exhibited poor water repellent properties, as shown by the very low contact angle of droplets of water sprinkled on the surface of the shingles, and the fact that when 20 ml. of water were applied to the surface of the shingles, the shingles were wetted by the water within a short period of time (as shown by the darkening of the shingles). When the surfaces of six-inch squares of shingle were immersed in 100 ml. of water for 10 minutes, the shingles warped considerably upon drying. After four months exposure to outdoor weathering conditions, the shingles were considerably stained but exhibited no visible signs of discoloration or deterioration, such as yellowing, chalking, or crazing.

*Example IV*

A 50 percent by weight polyvinyl butyral resin emulsion (sold commercially by the Shawinigan Resins Corporation, Springfield, Massachusetts, as "Butvar Dispersion BR") was diluted to 6 percent by weight polyvinyl butyral resin content, and 18 grams of the resulting emulsion were sprayed on the surface of several one-foot by two-foot asbestos-cement shingles which had been aged from 2 to 5 days after manufacture. This gave a resin loading of 1.08 grams of polyvinyl butyral on each of the shingles (this corresponds to a resin loading of 61.5 grams of polyvinyl butyral per "square"). One-half of the treated shingles were then cured by storing for 28 days at room temperature, and the other half were cured by autoclaving with steam for 8 hours at 100 p.s.i.

The storage-cured shingles manifested a high gloss surface but exhibited slight bloom. These shingles exhibited poor water repellent properties, as shown by the absence of a contact angle of droplets of water sprinkled on the surface of the shingles, and the fact that when 20 ml. of water were applied to the surface of the shingles, the shingles were wetted by the water within a short period of time (as shown by the darkening of the shingles). When the surfaces of six-inch squares of shingle were immersed in 100 ml. of water for 10 minutes, the shingles warped considerably upon drying.

The autoclave-cured shingles manifested a medium gloss surface but exhibited considerable bloom. These shingles exhibited poor water repellent properties, as shown by the absence of a contact angle of droplets of water sprinkled on the surface of the shingles, and the fact that when 20 ml. of water were applied to the surface of the shingles, the shingles were wetted by the water within a short period of time (as shown by the darkening of the shingles). When the surfaces of six-inch squares of shingle were immersed in 100 ml. of water for 10 minutes, the shingles warped considerably upon drying.

Example V

Eighteen grams of an aqueous emulsion containing 3 percent by weight polystyrene, 3 percent by weight polyethylene and 2 percent by weight of an amylpolysiloxane resin prepared in accordance with Example I were sprayed on the surface of several one-foot by two-foot asbestos-cement shingles which had been aged from 2 to 5 days after manufacture. This gave a resin loading of 0.54 gram of polystyrene, 0.54 gram of polyethylene and 0.36 gram of amylpolysiloxane on each of the shingles (this corresponds to a resin loading of 30.8 grams of polystyrene, 30.8 grams of polyethylene and 20.5 grams of amylpolysiloxane per "square"). One-half of the treated shingles were then cured by storing for 28 days at room temperature, and the other half were cured by autoclaving with steam for 8 hours at 100 p.s.i.

The treated shingles in each instance manifested a medium gloss surface and exhibited slight bloom. Good water repellent properties were exhibited by the treated shingles, as shown by the fairly high contact angle of droplets of water sprinkled on the surface of the shingles, and the fact that when 20 ml. of water were applied to the surface of the shingles, the water evaporated without any visible signs of wetting the shingles (no darkening of the shingles). When the surfaces of six-inch squares of shingle were immersed in 100 ml. of water for 10 minutes, the shingles exhibited no visible signs of warping after drying. After four months exposure to outdoor weathering conditions, the shingles were slightly stained and badly yellowed, chalked and crazed.

Example VI

Eighteen grams of an aqueous emulsion containing 6 percent by weight polyethylene and 2 percent by weight of an amylpolysiloxane resin prepared in accordance with Example I were sprayed on the surface of several one-foot by two-foot asbestos-cement shingles which had been aged from 2 to 5 days after manufacture. This gave a resin loading of 1.08 grams of polyethylene and 0.36 gram of amylpolysiloxane on each of the shingles (this corresponds to a resin loading of 61.5 grams of polyethylene and 20.5 grams of amylpolysiloxane per "square"). One-half of the treated shingles were then cured by storing for 28 days at room temperature, and the other half were cured by autoclaving with steam for 8 hours at 100 p.s.i.

The storage-cured shingles exhibited slight bloom and only slight gloss. These shingles exhibited poor water repellent properties, as shown by the fact that when 20 ml. of water were applied to the surface of the shingles, the shingles were wetted by the water within a short period of time (as shown by the darkening of the shingles). When the surfaces of six-inch squares of shingle were immersed in 100 ml. of water for 10 minutes, the shingles warped slightly upon drying. After four months exposure to outdoor weathering conditions, the shingles were slightly stained and slightly yellowed, chalked and crazed.

The autoclave-cured shingles manifested no visible gloss and exhibited considerable bloom. These shingles exhibited poor water repellent properties, as shown by the low contact angle of droplets of water sprinkled on the surface of the shingles, and the fact that when 20 ml. of water were applied to the surface of the shingles, the shingles were wetted by the water within a short period of time (as shown by the darkening of the shingles). When the surfaces of six-inch squares of shingle were immersed in 100 ml. of water for 10 minutes, the shingles warped considerably upon drying. After four months exposure to outdoor weathering conditions, the shingles were slightly stained and slightly yellowed, chalked and crazed.

Example VII

Eighteen grams of an aqueous emulsion containing 2 percent by weight of a dimethylsiloxane oil were sprayed on the surface of several one-foot by two-foot asbestos-cement shingles which had been aged from 2 to 5 days after manufacture. This gave a loading of 0.36 gram of dimethylsiloxane on each of the shingles (this corresponds to a loading of 20.5 grams of dimethylsiloxane per "square"). One-half of the treated shingles were then cured by storing for 28 days at room temperature, and the other half were cured by autoclaving with steam for 8 hours at 100 p.s.i.

In both instances, the effectiveness of the coating was destroyed due to the highly alkaline nature of the fresh shingles.

Example VIII

Eighteen grams of an aqueous emulsion containing 2 percent by weight ethylpolysiloxane were sprayed on the surface of several one-foot by two-foot asbestos-cement shingles which had been aged from 2 to 5 days after manufacture. This gave a loading of 0.36 gram of ethylpolysiloxane on each of the shingles (this corresponds to a loading of 20.5 grams of ethylpolysiloxane per "square"). One-half of the treated shingles were then cured by storing for 28 days at room temperature, and the other half were cured by autoclaving with steam for 8 hours at 100 p.s.i.

In both instances, the effectiveness of the coating was destroyed due to the highly alkaline nature of the fresh shingles.

Example IX

Eighteen grams of an aqueous emulsion containing 6 percent by weight polyacrylate and 2 percent by weight of an amylpolysiloxane resin prepared in accordance with Example I were sprayed on the surface of several one-foot by two-foot asbestos-cement shingles which had been aged from 2 to 5 days after manufacture. This gave a resin loading of 1.08 grams of polyacrylate and 0.36 grams of amylpolysiloxane on each of the shingles (this corresponds to a resin loading of 61.5 grams of polyacrylate and 20.5 grams of amylpolysiloxane per "square"). One-half of the treated shingles were then cured by storing for 28 days at room temperature, and the other half were cured by autoclaving with steam for 8 hours at 100 p.s.i.

The storage-cured shingles manifested a medium gloss surface and exhibited slight bloom. These shingles exhibited poor water repellent properties, as shown by the very low contact angle of droplets of water sprinkled on the surface of the shingles, and the fact that when 20 ml. of water were applied to the surface of the shingles, the shingles were wetted by the water within a short period of time (as shown by the darkening of the shingles). When the surfaces of six-inch squares of shingle were immersed in 100 ml. of water for 10 minutes, the shingles warped slightly upon drying. After four months exposure to outdoor weathering conditions, the shingles were slightly stained and slightly yellowed, chalked and crazed.

The autoclave-cured shingles manifested a medium gloss surface but exhibited considerable bloom. These shingles exhibited poor water repellent properties, as shown by the very low contact angle of droplets of water sprinkled on the surface of the shingles, and the fact that when 20 ml. of water were applied to the surface of the shingles, the shingles were wetted by the water within a short period of time (as shown by the darkening of the shingles). When the surfaces of six-inch squares of shingle were immersed in 100 ml. of water for 10 minutes, the shingles warped slightly upon drying.

After four months exposure to outdoor weathering conditions, the shingles were slightly stained and slightly yellowed, chalked and crazed.

What is claimed is:
1. A method of improving the water-repellent and weathering properties of an asbestos-cement structural unit which comprises (1) applying to the surface of said structural unit a composition consisting of an aqueous emulsion of a polyvinyl butyral resin and an amylpolysiloxane resin in an amount sufficient to impart a loading of from about 10 to about 320 grams of combined resin per 114 square feet of said surface, said emulsion containing a total resin content of from about 1.6 percent to about 32 percent by weight of said emulsion, said total resin content consisting of from about 33 percent to about 95 percent by weight of said polyvinyl butyral resin and from about 5 percent to about 67 percent by weight of said amylpolysiloxane resin, said amylpolysiloxane resin being selected from the class consisting of (a) monoamylpolysiloxane resins prepared by hydrolyzing and condensing amyltrichlorosilane and (b) mono-amylpolysiloxane resins prepared by hydrolyzing and condensing a mixture of amyltrichlorosilane and tetraethyl silicate, and (2) thereafter curing said structural unit by maintaining said structural unit at a temperature of at least room temperature.

2. A method in accordance with claim 1 wherein said total resin content consists of from about 57 percent to about 82 percent by weight of said polyvinyl butyral resin and from about 18 percent to about 43 percent by weight of said amylpolysiloxane resin.

3. A method in accordance with claim 1 wherein said polyvinyl butyral resin contains from about 2 percent to about 25 percent by weight of hydroxyl groups.

4. A method of improving the water-repellent and weathering properties of an asbestos-cement structural unit which comprises (1) applying to the surface of said structural unit a composition consisting of an aqueous emulsion of a polyvinyl butyral resin and an amylpolysiloxane in an amount sufficient to impart a loading of from about 10 to about 320 grams of combined resin per 114 square feet of said surface, said emulsion containing a total resin content of from about 1.6 percent to about 32 percent by weight of said emulsion, said total resin content consisting of from about 33 percent to about 95 percent by weight of said polyvinyl butyral resin and from about 5 percent to about 67 percent by weight of a mono-amylpolysiloxane resin prepared by hydrolyzing and condensing a mixture of amyltrichlorosilane and tetraethyl silicate in a ratio of 6.5 moles of amyltrichlorosilane per mole of tetraethyl silicate, and (2) thereafter curing said structural unit by maintaining said structural unit at a temperature of at least room temperature.

5. A composition consisting of an aqueous emulsion of a polyvinyl butyral resin and an amylpolysiloxane resin, said emulsion containing a total resin content of from about 1.6 percent to about 32 percent by weight of said emulsion, said total resin content consisting of from about 33 percent to about 95 percent by weight of said polyvinyl butyral resin and from about 5 percent to about 67 percent by weight of said amylpolysiloxane resin, said amylpolysiloxane resin being selected from the class consisting of (a) mono-amylpolysiloxane resins prepared by hydrolyzing and condensing amyltrichlorosilane and (b) mono-amylpolysiloxane resins prepared by hydrolyzing and condensing a mixture of amyltrichlorosilane and tetraethyl silicate.

6. A composition in accordance with claim 5 wherein said total resin content consists of from about 57 percent to about 82 percent by weight of said polyvinyl butyral resin and from about 18 percent to about 43 percent by weight of said amylpolysiloxane resin.

7. A composition in accordance with claim 5 wherein said polyvinyl butyral resin contains from about 2 percent to about 25 percent by weight of hydroxyl groups.

8. A composition consisting of an aqueous emulsion of a polyvinyl butyral resin and an amylpolysiloxane resin, said emulsion containing a total resin content of from about 1.6 percent to about 32 percent by weight of said emulsion, said total resin content consisting of from about 33 percent to about 95 percent by weight of said polyvinyl butyral resin and from about 5 percent to about 67 percent by weight of a mono-amylpolysiloxane resin prepared by hydrolyzing and condensing a mixture of amyltrichlorosilane and tetraethyl silicate in a ratio of 6.5 moles of amyltrichlorosilane per mol of tetraethyl silicate.

References Cited in the file of this patent

UNITED STATES PATENTS

| 2,506,320 | Vail | May 2, 1950 |
| 2,706,723 | Bass | Apr. 19, 1955 |
| 2,750,302 | Camarda | June 12, 1956 |
| 2,833,732 | Weyer | May 6, 1958 |